(No Model.)
E. CLARK.
SHAFT SUPPORT.
No. 401,412. Patented Apr. 16, 1889.
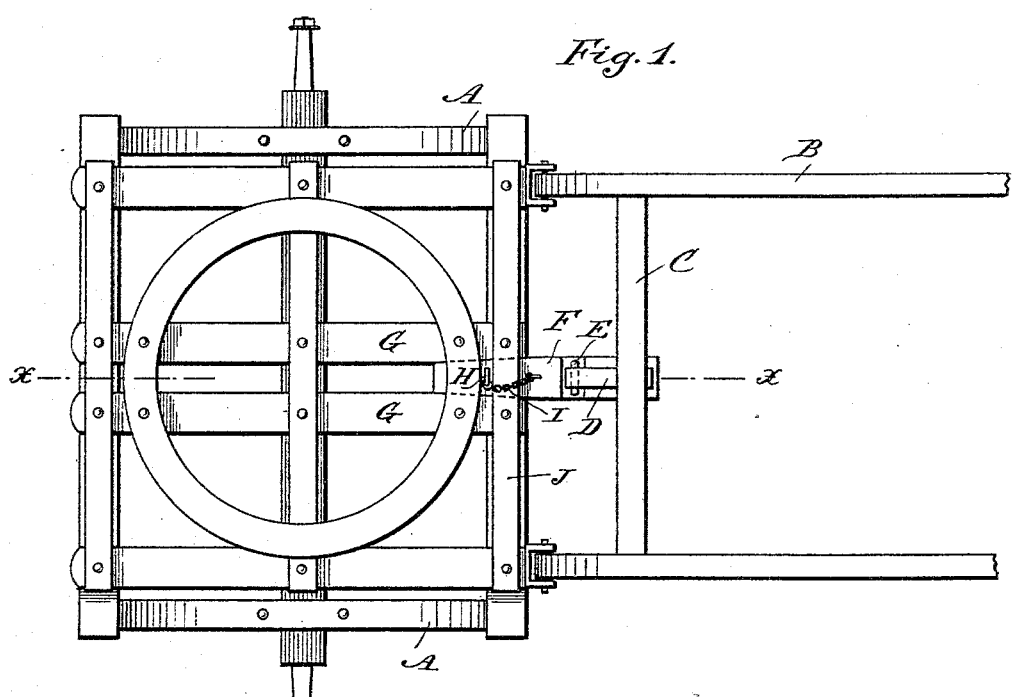
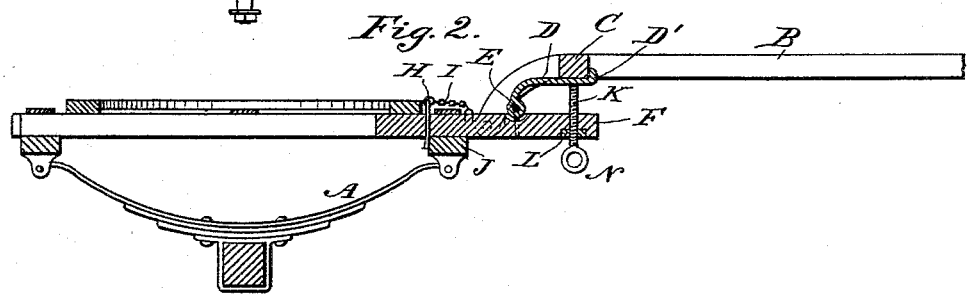
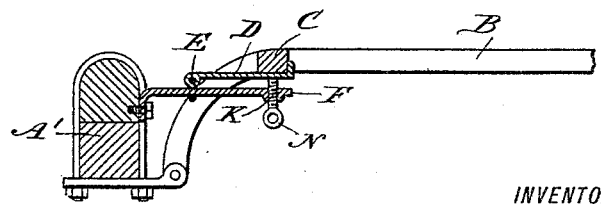
WITNESSES:
D. C. Reusch.
E. Sedgwick
INVENTOR:
E. Clark
BY Munn & Co.
ATTORNEYS.

UNITED STATES PATENT OFFICE.

EDWARD CLARK, OF NEW YORK, N. Y.

SHAFT-SUPPORT.

SPECIFICATION forming part of Letters Patent No. 401,412, dated April 16, 1889.

Application filed December 31, 1888. Serial No. 295,050. (No model.)

*To all whom it may concern:*

Be it known that I, EDWARD CLARK, of the city, county, and State of New York, have invented a new and Improved Shaft-Support, of which the following is a full, clear, and exact description.

The object of the invention is to provide a new and improved shaft-support which is simple and durable in construction and serves to take off the weight and strain from the back of the horse while the latter is hitched to the vehicle.

The invention consists of a plate hinged on the vehicle and engaging the transverse beam of the shafts, and a screw on which rests the free end of the said pivoted plate, and which serves to adjust the latter to suit the height of the horse.

The invention also consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a plan view of the improvement as applied. Fig. 2 is a sectional side elevation of the same on the line $x\ x$ of Fig. 1, and Fig. 3 is a sectional side elevation of a modified form of the improvement.

To the vehicle A are pivoted, in any suitable manner, the shafts B, provided with the usual transverse beam, C. The latter is adapted to rest in its middle on the top of a plate, D, pivoted at E to a beam, F, which passes between the hounds G of the vehicle, and is secured in place thereon by a pin, H, passing through the beam F in the rear of the transverse beams J, passing over the hounds G, as is plainly shown in Figs. 1 and 2. A chain, I, is secured to the pin H, and is fastened to the beam F in front of the transverse beam J. When the pin H is removed, it hangs by its chain I on the beam F, so as to be always in place on the latter.

The front end of the plate D is provided with an upward projection, D′, engaging the front end of the transverse beam C of the shafts B. The free end of the pivoted plate D rests on the upper end of a screw-rod, K, screwing in a nut, L, fastened in the front end of the beam F, as is plainly shown in Fig. 2. On the lower end of the screw-rod K is formed a handle, N, for conveniently turning the screw-rod K in the nut L. As shown in Fig. 3, the vehicle is of different construction from that shown in Figs. 1 and 2, and in this case the shafts are pivoted directly to the axle. The beam F is also secured to the axle, and the screw-rod K screws directly in the front end of the said beam.

The operation is as follows: When the beam F is in front of the vehicle, as shown in the drawings, then the free end of the pivoted plate D rests on the upper end of the screw-rod K, so that when the shafts B are let down into a horizontal position the transverse beam C of the shafts rests on top of the pivoted plate D. The shafts B are thus supported in a horizontal position, and when the animal is hitched to the shafts in the usual manner no strain or weight of the shafts rests on the horse's back. The shafts are adjusted to any desired height in relation to the height of the horse by turning the screw-rod K up or down, so as to slightly raise or lower the free end of the pivoted plate D, and consequently raising or lowering the shafts B.

It will be seen that by this very simple device I freely support the shafts B, and thereby remove all strain from the animal's back while the latter is hitched to the vehicle and pulls the same. Sore backs—such as are frequently found among horses pulling heavy loads—are entirely prevented.

Having thus fully described my invention, I claim as new and desire to secure by Letters Patent—

1. A shaft-support comprising a beam secured to the front end of the vehicle and projecting under the shafts, a stiff plate pivoted at one end to the top of the said beam and engaging with its free end the under side of the transverse beam of the shafts, and a screw-rod screwing vertically in the outer end of the said beam and supporting at its upper end the free end of the said pivoted stiff plate, substantially as shown and described.

2. A shaft-support comprising a beam secured to the front end of the vehicle and projecting under the shafts, a pivot formed on the top of the said beam near its front end, a stiff plate hung with one end on the said pivot and engaging with its free end the under side of the transverse beam of the shafts, a nut held in the outer end of the said beam, and a screw-rod screwing vertically in the said nut and supporting at its upper end the free end of the said pivoted stiff plate, substantially as shown and described.

3. The combination, with the shafts pivoted to the vehicle and provided with a transverse beam, of a longitudinal beam secured to the front end of the vehicle and projecting under the said transverse beam, a stiff plate pivoted at one end to the top of the said longitudinal beam and engaging with its free end the under side of the said transverse beam of the shafts, and a screw-rod screwing vertically in the outer end of the said longitudinal beam and supporting at its upper end the free end of the said pivoted stiff plate, substantially as shown and described.

4. The combination, with the shafts pivoted to the vehicle and provided with a transverse beam, of a longitudinal beam secured to the front end of the vehicle and projecting under the said transverse beam, a stiff plate pivoted at one end to the top of the said longitudinal beam and engaging with its free end the under side of the said transverse beam of the shafts, a screw-rod screwing vertically in the outer end of the said longitudinal beam and supporting at its upper end the free end of the said pivoted stiff plate, and an upwardly-extending projection formed on the free end of the said stiff plate and engaging the front edge of the said transverse beam of the shafts, substantially as shown and described.

EDWARD CLARK.

Witnesses:
   THEO. G. HOSTER,
   EDGAR TATE.